United States Patent

Seidel et al.

[11] Patent Number: 5,960,619
[45] Date of Patent: Oct. 5, 1999

[54] MULCHING DISC FOR A LAWN MOWER

[75] Inventors: David Seidel, Minto Heights; Dominic Tamas, Northbridge, both of Australia

[73] Assignee: Sunbeam Corporation Limited, New South Wales, Australia

[21] Appl. No.: 08/867,969

[22] Filed: Jun. 3, 1997

[51] Int. Cl.[6] .................................................. A01D 34/52
[52] U.S. Cl. .............................. 56/255; 56/17.5; 56/295; 56/DIG. 17; 56/DIG. 20
[58] Field of Search ........................ 56/255, 295, 17.5, 56/DIG. 17, DIG. 20, 320.1

[56] References Cited

U.S. PATENT DOCUMENTS

| | | | |
|---|---|---|---|
| 3,085,386 | 4/1963 | Slemmons | 56/295 |
| 3,220,170 | 11/1965 | Smith et al. | 56/295 |
| 5,056,605 | 10/1991 | Bond et al. | 56/255 |
| 5,094,064 | 3/1992 | Thedford | 56/30 |
| 5,297,637 | 3/1994 | Rowlett | 56/295 |
| 5,363,635 | 11/1994 | White, III et al. | 56/255 |
| 5,373,687 | 12/1994 | Secord | 56/17.5 |
| 5,375,400 | 12/1994 | Darden | 56/17.5 |
| 5,442,902 | 8/1995 | Mosley et al. | 56/17.5 |
| 5,515,670 | 5/1996 | Meinerding | 56/295 |
| 5,561,972 | 10/1996 | Rolfe | 56/295 |
| 5,642,609 | 7/1997 | Morrison | 56/295 |

Primary Examiner—Thomas B. Will
Assistant Examiner—Arpad Fabian Kovacs
Attorney, Agent, or Firm—Frommer Lawerence & Haug LLP; William S. Frommer

[57] ABSTRACT

A cutting disc (12) for a lawn mower, the disc (12) having a plurality of cutting blades (13) and being formed with apertures (23). Associated with the apertures (23) are fan blades (22) which force air downwardly through the disc (12) to aid in mulching cut grass.

6 Claims, 2 Drawing Sheets

MULCHING DISC FOR A LAWN MOWER

TECHNICAL FIELD

The present invention relates to lawn mowers and more particularly to mulching apparatus incorporated therein.

BACKGROUND OF THE INVENTION

More recently lawn mowers with catchers which are provided with cutting blades mounted for rotation about a generally vertical axis have been modified to mulch as well as catch grass. They perform poorly when used as a mulcher particularly when using a blade disc and swing back blades, that are the same as those used for good grasscatching.

One problem confronted by the use of grasscatching blades is properly dispersing the clippings. Until now the clippings have tended to clump and remain on the surface.

A further problem that results from the above short comings is that the cuttings detract from the appearance of a cut lawn and secondly the cuttings tend to find their way into the home.

The above problems are exacerbated if the grass is damp or wet.

Further, the traditional blade bar used for mulching does not cut the grass cleanly once the cutting edge has become worn, frequently the grass will look bruised, ragged and not uniform.

A further disadvantage of mulching bars is that they can cause damage to the engine crankshaft.

The use of mulching bars has also required a greater power output from the lawn mower motor.

U.S. Pat. Nos. 5,094,064, 3,085,386 and 3,220,170 describe and depict examples of the above discussed mulching bars.

U.S. Pat. No. 5,561,972 describes a mulching disc. The device of this particular USA patent also fails to perform satisfactorily as the air circulation generated fails to convey the cuttings efficiently.

OBJECT OF THE INVENTION

It is the object of the present invention to overcome or substantially ameliorate the above disadvantages.

SUMMARY OF THE INVENTION

There is disclosed herein a lawn mower disc to pivotally support cutting blades, said disc comprising:
a central portion providing a shaft engaging part via which the disc is driven about a predetermined axis;
an inclined portion surrounding the central portion and extending downwardly therefrom, the inclined portion having a plurality of apertures;
a peripheral region surrounding the inclined portion and extending therefrom; and
fan means to direct an air stream downwardly through the disc, said fan means being positioned radially from said axis, said fan means including a plurality of blades extending upwardly from said inclined portion and associated with the apertures so that the blades move air therethrough upon rotation of the disc.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
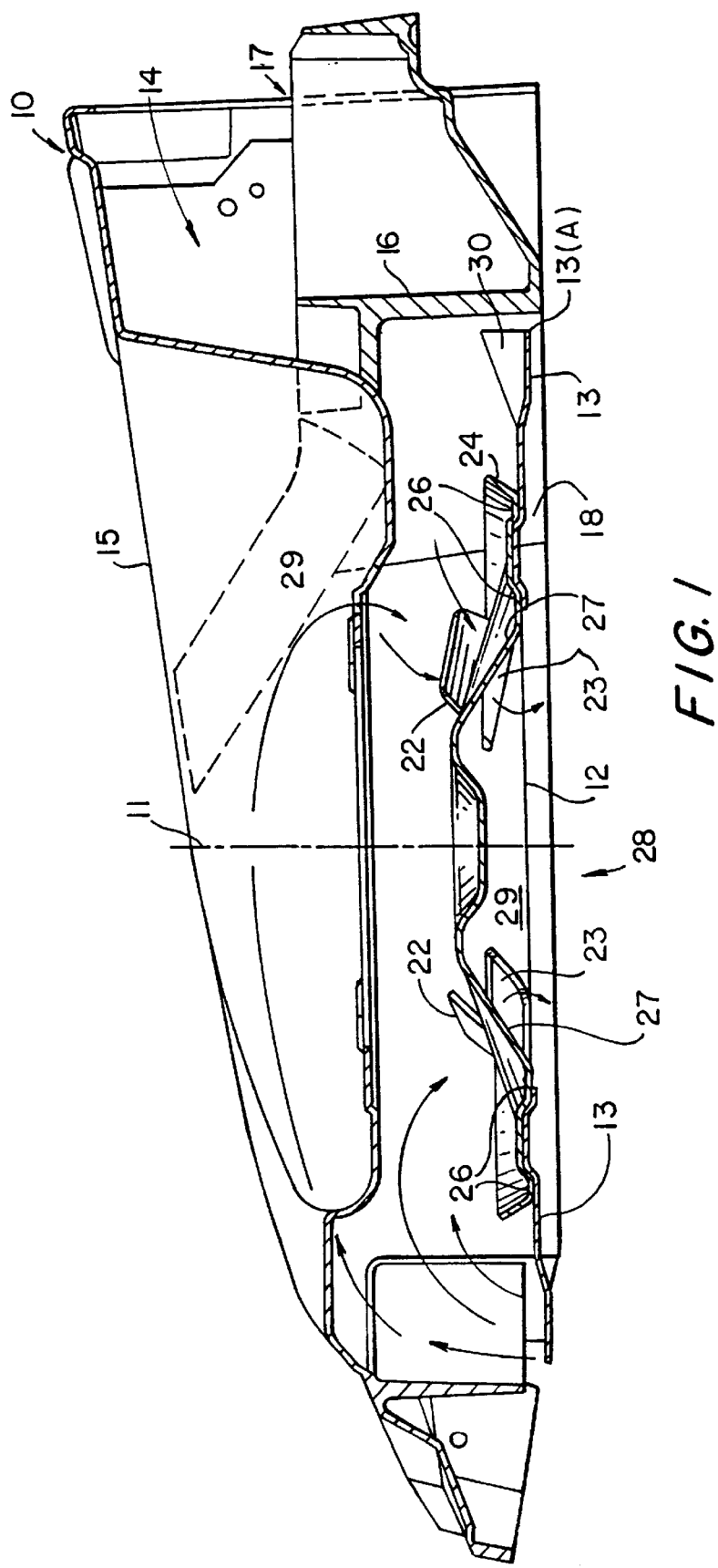
FIG. 1 is a schematic section side elevation of the main body of a lawn mower, a blade disc and cutting blades.
Figure 3:
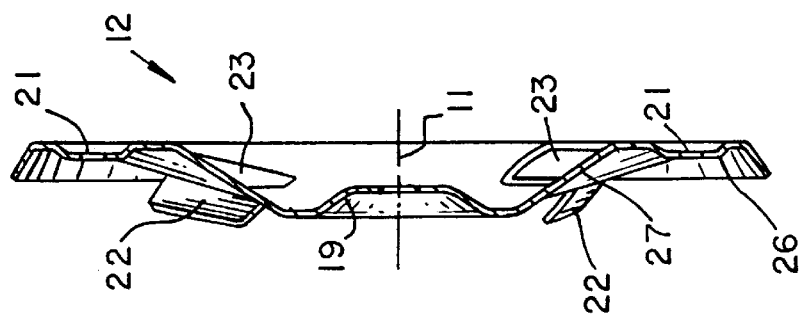
FIG. 3 is a schematic section side elevation of the blade disc of FIG. 2 sectioned along the line A—A.
Figure 2:
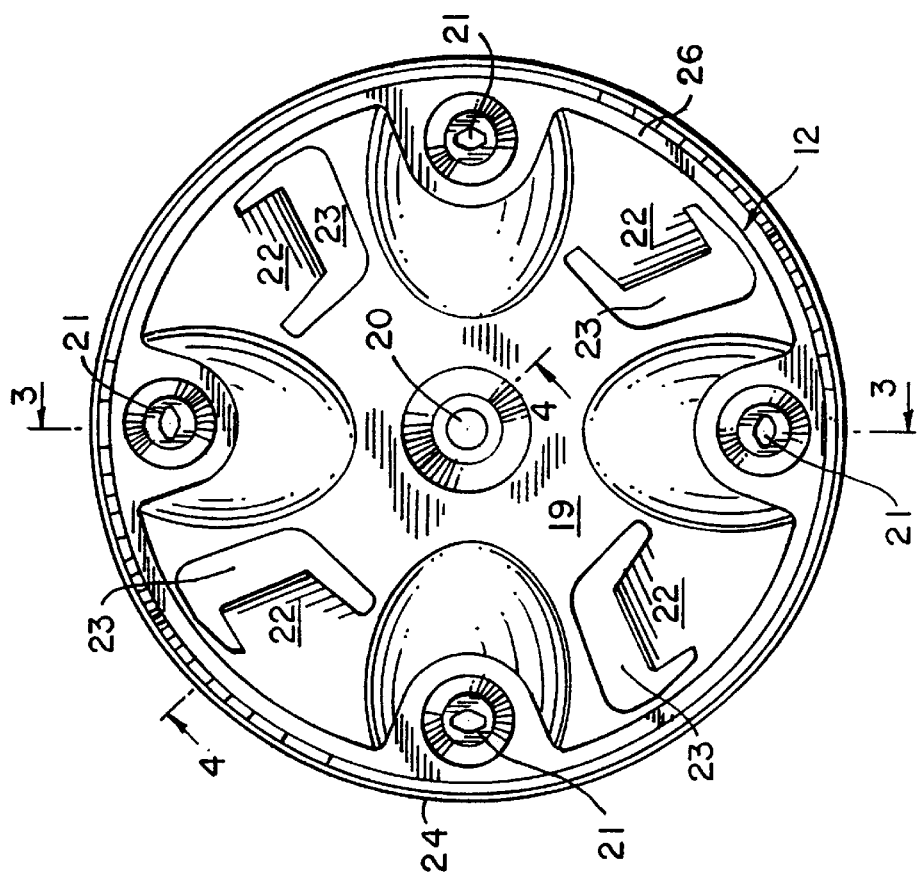
FIG. 2 is a schematic top plan view of the blade disc illustrated in FIG. 1.
Figure 4:
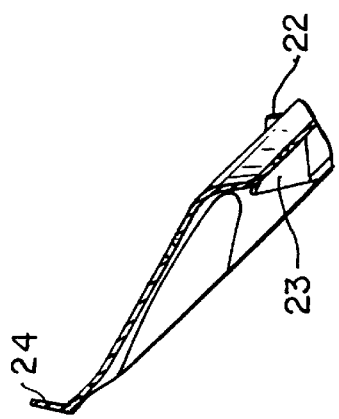
FIG. 4 is a schematic elevation of the disc of FIG. 2 sectioned along the line B—B.

In the accompanying drawings there is schematically depicted the main base 10 of a "push" mower. The base 10 would have mounted upon it a motor having a drive shaft driven rotatably about the axis 11. The drive shaft would be bolted to a blade disc 12 which supports the cutting blades 13. The disc 12 is located within the cavity 28 provided by the base 10. Each of the cutting blades 13 is attached to the disc 12 by means of a nut and bolt. The blade 13 can pivot about their attachment point to the blade disc 12. More particularly, the blade 13 would pivot or rotate if an obstacle was encountered. In this embodiment the blade 13 illustrated is a standard cutting-catching blade and accordingly has an inclined flange 30 which creates an upward air movement.

The base 10 is of a generally conventional construction in that it provides a rear chute area 14 through which cuttings would normally be directed to the catcher. The base is also provided with an angularly extending duct 15 which again directs cuttings towards the rear of the base 10.

In this particular embodiment the chute area 14 is provided with a plug 16 which closes off the rear chute opening 17 so that the cuttings can no longer exit therefrom. The plug 16 has an extension 18 which cooperates with the base 10 to provide a generally continuous skirt around the blade tip circle 13(A).

The blade disc 12 has a central portion 19 via which the disc 12 is attached to the drive shaft of the motor. The portion 19 has an aperture 20 through which a bolt would pass. The extremity of the shaft would engage a nut or bolt which would secure the disc 12 to the shaft via the aperture 20.

Spaced from the central portion 19 are shaped apertures 21 through which bolts pass to secure the blades 13 to the disc 12.

The disc 12 is provided with a fan means consisting of blades 22. The blades 22 project up above the major upper surface of the disc 12 to engage air above the disc 12 and force it down through apertures 23. The blades 22 in combination the blades 13 cause the air to circulate as indicated by the arrows. This circulating air takes with it the grass cuttings. Still further, this air stream aids in delivering the grass cuttings into the lawn below the cut upper surface thereof. Any cuttings left circulating with the air are further engaged by the blades 13 to aid in mulching the cuttings.

Air passing up along the duct 15 takes with it cuttings to deliver the cuttings back to the blades 13 to again aid in recutting the grass and mulching it.

Further, this plug has an upper extension 29, that extends into the duct 15, so as to progressive's direct cuttings back down to the cutting blades.

The above described preferred embodiment specifically has the advantage of gathering any excess grass that is left on top of the cut lawn and returning it to the blades 13 for recutting. The grass will continue to circulate until it is properly mulched and delivered below the upper surface of the cut lawn.

A user of the lawn mower having the above disc 12, may also use the lawn mower in its normal catching mode. The plug 16 is removed and the catcher attached. The grass will then be propelled through the rear chute area 14 to the catcher.

The disc 12 may have upwardly extending peripheral flange 24 beyond which the blades 13 extend. The flange 24 extends from the peripheral region 26 of the disc 12. The peripheral region 26 extends to an inclined intermediate portion 27 which in turn extends upwardly to the central portion 19. The portion 27 is inclined to the portions 19 and 26 by an acute angle. The peripheral portion 26 is located below the central portion 19. The fan blades 22 project upwardly from the intermediate portion 27.

The central portion 19 and inclined portion 27 provide a raised central hub 28 containing the blades 22. The blades 22, by being located on the inclined portion 27, cause the air stream entering the space 29, below the hub 28, to have a radially inward direction component. This direction component aids in counteracting centrifugal forces. This in turn enhances delivery of cuttings to the grass layer below the disc 12. Accordingly, the air stream passing through the apertures 23 is directed radially inward as well as down.

It should also be noted that the apertures 23 and blades 22 as spaced radially a significant distance from the flanges 30, and that the peripheral region 26 separates the upper air stream from the lower air stream.

We claim:

1. A lawn mower disc to pivotally support cutting blades, said disc comprising:

a central portion providing a shaft engaging part via which the disc is driven about a predetermined axis;

an inclined intermediate portion surrounding the central portion and extending downwardly and radially therefrom, the inclined intermediate portion having a plurality of apertures;

a peripheral region below and surrounding the inclined intermediate portion and extending therefrom; and fan means to direct an air stream downwardly through the disc, said fan means being positioned radially from said axis, said fan means including a plurality of blades extending upwardly from said inclined intermediate portion and associated with the apertures so that the blades move air downwardly therethrough upon rotation of the disc.

2. The disc of claim 1, wherein said intermediate portion is inclined to the central portion and peripheral region by an acute angle, and said blades direct the air stream radially inwardly and down through the apertures.

3. The lawn mower disc of claim 1, further including an upwardly extending annular flange on said peripheral region.

4. In combination, the lawn mower disc of claim 2 and a plurality of cutting blades secured to the peripheral region and projecting generally radially therefrom, said cutting blades being configured to provide an upwardly directed air stream.

5. In combination, a main base of a lawn mower and the combination of claim 4, said main base having a cavity within which the disc is located for rotation about said axis, said base, disc and cutting blades being configured to cause air to circulate downwardly through the disc and upwardly past the cutting blades to aid in delivering cut grass to a position below a grass surface over which the disc is passing and to aid in mulching cut grass.

6. The combination of claim 5, wherein said main base is provided with a grass deliver chute to communicate with a catcher, and means to selectively close said chute so that cut grass is re-circulated to be mulched rather than delivered to the catcher.

* * * * *